US007095322B2

United States Patent
Schumacher et al.

(10) Patent No.: US 7,095,322 B2
(45) Date of Patent: Aug. 22, 2006

(54) MAGNETICALLY OPERATED DOOR-OPEN INDICATOR

(76) Inventors: Marvin Henry Schumacher, 3223 Lost Dauphin Rd., Depere, WI (US) 54115; George L Smith, N 9436 Grandy Rd., Shiocton, WI (US) 54170

( * ) Notice: Subject to any disclaimer, the term of this patent is extended or adjusted under 35 U.S.C. 154(b) by 234 days.

(21) Appl. No.: 10/926,935

(22) Filed: Aug. 25, 2004

(65) Prior Publication Data

US 2006/0042538 A1    Mar. 2, 2006

(51) Int. Cl.
*G08B 13/08* (2006.01)
(52) U.S. Cl. ............... 340/545.1; 340/547; 340/457; 359/838; 359/865
(58) Field of Classification Search ........... 340/545.1, 340/431, 468, 425.5, 547, 545.9, 438, 436, 340/457, 540; 359/850, 865, 838, 841
See application file for complete search history.

(56) References Cited

U.S. PATENT DOCUMENTS

| | | | | |
|---|---|---|---|---|
| 4,427,975 A | * | 1/1984 | Kinzie | 340/547 |
| 4,835,905 A | * | 6/1989 | Lasier et al. | 49/14 |
| 5,602,526 A | * | 2/1997 | Read | 340/457 |
| 6,374,766 B1 | * | 4/2002 | Clark | 116/28 R |

\* cited by examiner

*Primary Examiner*—Thomas Mullen
*Assistant Examiner*—Daniel Previl
(74) *Attorney, Agent, or Firm*—Marvin H Schumacher

(57) ABSTRACT

In accordance with the present invention, the rear roll-up, truck-door indicator is a magnetically operated indicator which is visible to the truck driver by simply looking into the driver's rear view mirror. The invention relates to a rear roll-up, truck-door open-or-closed indicator. The indicator will be located on the outside of the left side of the truck box body. There will be a clear tube placed through the truck box and will extend outside of the body. This tube will be placed at a slight upward angle from the outside of the truck to the inside of the truck box. A colorful indicator piston will be placed inside of this tube. The indicator will be colorful when the door is open; conversely, the indicator will not be colorful when the door is closed.

9 Claims, 4 Drawing Sheets

MAGNETICALLY OPERATED DOOR-OPEN INDICATOR

FIELD OF THE INVENTION

The present invention relates to a truck rear-roll-up, door-open indicator, and, more particularly, to a rear door-open indicator, mounted on the outside of the truck body.

BACKGROUND OF THE INVENTION

There is a serious need for an easy to install, inexpensive, simple, trouble free, indicator, mounted on the side of the truck body, which is easily seen from the driver's seat, simply by looking into the rear view mirror. Currently the only way one can check that door, is by stopping the truck, leaving the cab and walking to the back of the truck. This takes time and can be dangerous. We have been in many trucking activities and have had, and witnessed other truckers having serious problems when something is stolen or something accidentally falls from the open rear door of their truck because the driver forgot to close that door. There are many reasons why a driver may accidentally leave the rear roll-up door open. The most common one happens when the driver is in a hurry and his concentration is interrupted just before he is ready to drive off. The driver will then be driving down the road wondering if the door is open or closed. This happens often and worrying about this adds a great deal of stress to the driver, to the point that it can detract the driver from driving safely. We have searched far and wide for a practical indicator to solve this problem with no success.

In defiance of the maxim "keep it simple", prior art comprises of more and more elaborate and complex mechanisms.

U.S. Pat. No. 4,334,388 (reissued as U.S. Pat. No. 4,562,664) issued to Kambic, shows an interesting door monitor unit, which is capable of indicating a door position. However, this design requires a complex combination of levers, electrical wiring, and switches that would be a maintenance problem if used on a truck with a roll-up rear door.

U.S. Pat. No. 4,835,905 issued to Lasier, et al, discloses a device with complicated parts and actions. This invention requires hydraulics, valves and switches all working together. This requires a difficult installation, which would be cost prohibitive to the truck owners.

U.S. Pat. No. 6,310,548 issued to Stephens, Jr., et al, discloses use of a magnetic field in part of its design. This design also requires electronic sensors and electrical wiring. These components would not be good to use on a truck where vibration and electrical maintenance would be required. This invention is designed for, and would work well in, a home system.

Truck owners are very concerned about corrosion and other maintenance costs. They don't want to add mechanically operated things that cause extra maintenance and they don't like to add electrically operated devices to their trucks because wiring or battery problems are a real headache for them.

No current approach addresses the need for a low maintenance, rear roll-up, truck-door indicator that needs no electrical hookups, no levers, no springs or other mechanical contacts. Our system is very easy to install and is close to maintenance free.

Our invention is made of plastic to make it weather tight and corrosion resistant.

Our invention has only one moving part and that is moved magnetically with no mechanical parts making contact.

Our invention needs no electrical wiring and no batteries to operate.

Our invention has a colorful indicator that is easily seen by the driver, simply by looking into the mirror.

It is therefore an object of the invention to provide a convenient roll-up, rear-door, open-or-closed indicator.

It is another object of the invention to provide a reduction of driver stress.

It is another object of the invention to provide time saved.

It is another object of the invention to provide a means of reducing accidents.

It is another object of the invention to provide an indicator that is clearly visible.

It is another object of the invention to provide an indicator that needs no mechanical or electrical connections.

It is another object of the invention to provide an indicator that has only one moving part, magnetically activated.

It is another object of the invention to provide an indicator that is corrosive-proof and needs no maintenance.

Further objects and advantages are to prevent loss of all or part of the truck's load and provide theft protection. Still further objects and advantages will become apparent from considerations of the ensuing description and drawings.

SUMMARY OF THE INVENTION

In accordance with the present invention, the rear roll-up, truck-door open-or-closed indicator is composed of a magnetically operated colorful indicator piston which is visible to the truck driver by simply looking into the rear view mirror.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
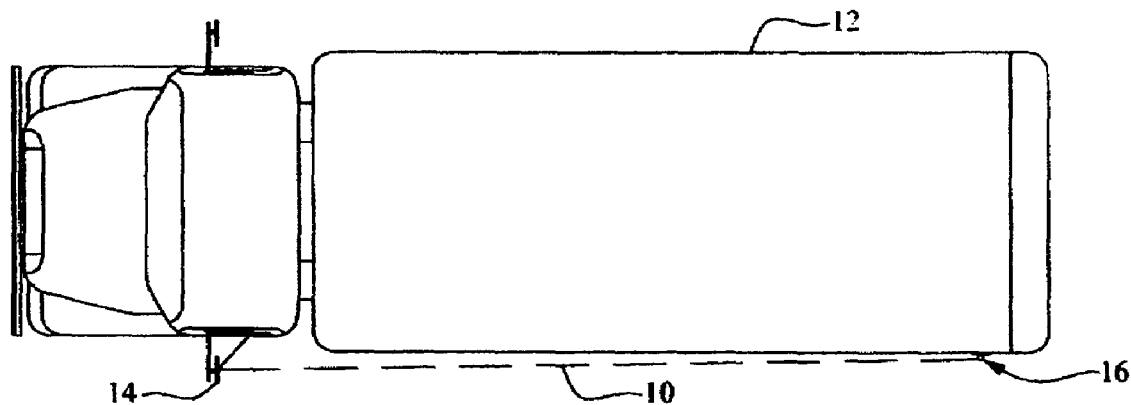
FIG. 1 is a perspective view of a truck to demonstrate where the indicator would be mounted on the truck box and shows how the driver could see the colorful indicator piston by looking into his rear-view mirror. The driver will have a line of sight to the installed indicator assembly. This figure includes a top and side view of a truck.
Figure 1:
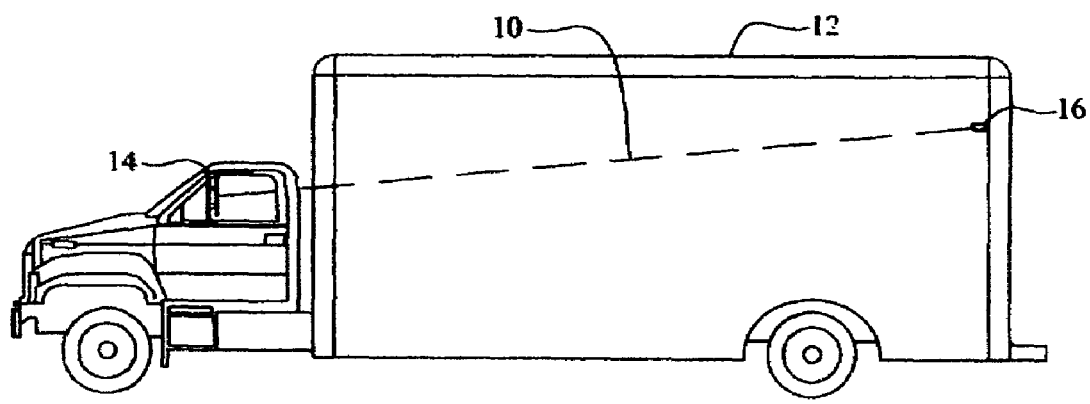

FIG. 1 is a perspective view of a truck to show how the driver can check the indicator from his seat, by looking into his left side rear-view mirror 14. This will give the driver an unobstructed line of sight to the installed indicator 16 assembly. FIG. 1 also shows where the device can be located on the truck. This is a suggested height but this can be raised or lowered to meet the driver's needs.

Figure 2:
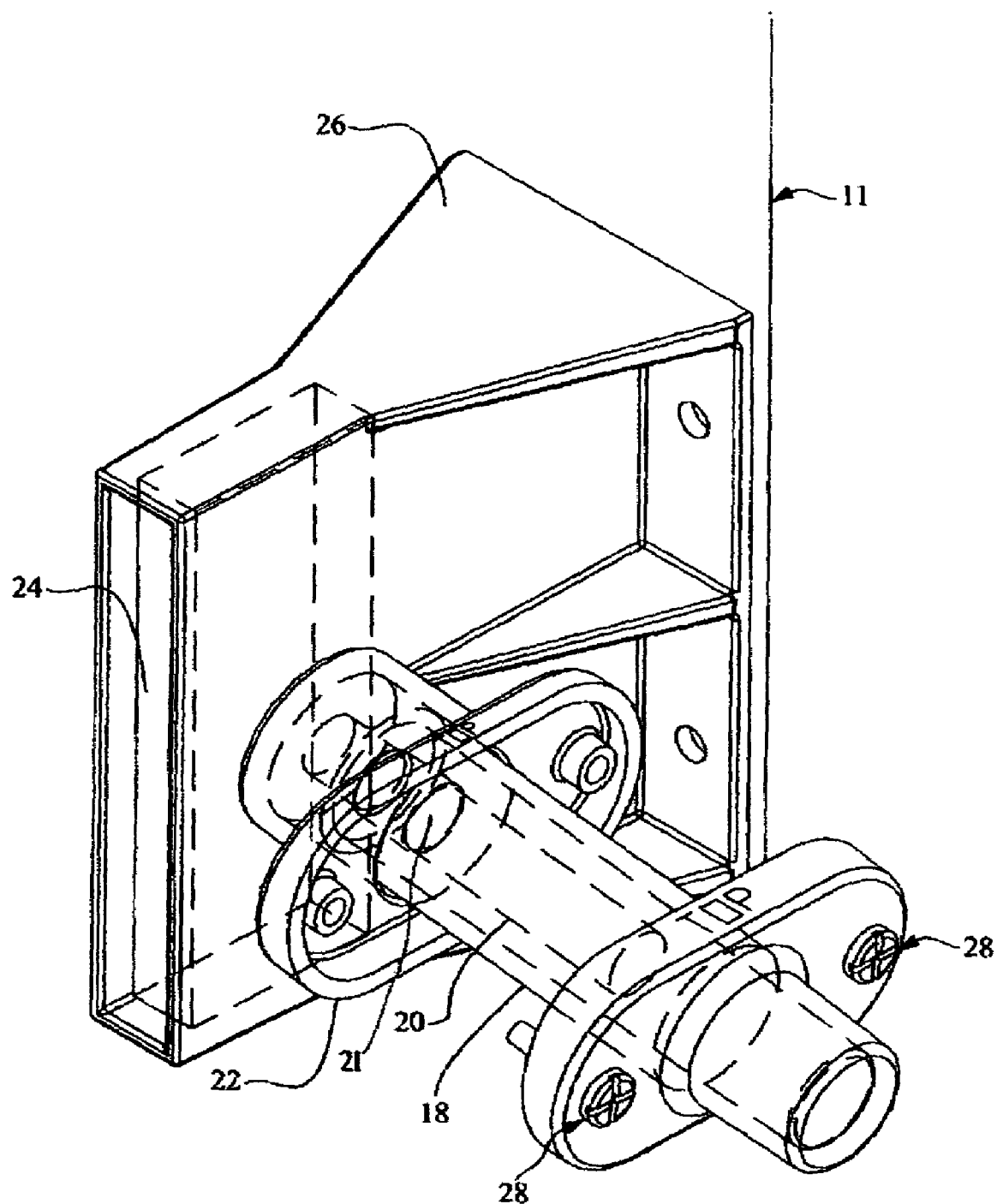
FIG. 2 is a perspective view of a completed indicator assembly, showing all of the parts, as they will be installed.

FIG. 2 shows that there are two magnets needed to make this invention work. One is in a bracket that mounts on the inside of the roll-up door near the left side of the truck. The second magnet (hereinafter referred to as the "piston magnet 21") is molded into a colorful indicator piston with encapsulated magnet 20 which is placed inside of a tube that goes through the truck body wall on the left rear side of the truck box 12. This colorful indicator piston with encapsulated magnet 20 is of small enough diameter to allow it to freely move back and forth within the tube.

Both ends of the tube are enclosed with covers to contain the colorful indicator piston with encapsulated magnet 20 and protect it from the environment.

The exterior clear plastic tube with exterior cover 18 acts as an extension of the tube. This tube extension protrudes far enough out from the truck wall to make it easily visible to the driver. When the truck door is open, the colorful indicator piston with encapsulated magnet 20 will appear in this tube exterior cover.

The interior tube cover 22 does not have to be of clear plastic but can be if this would make it more economical to produce both tube covers at the same time.

Furthermore, both of these covers serve two more purposes. The first purpose is to provide a means of attaching the tube assembly to the truck wall with mounting screw 28. There are holes for screws in each of these covers for this as well as holes in the door bracket with encapsulated bar magnet 26.

The next purpose is to provide a means to install the tube at a slight upward incline to assure the colorful indicator piston with encapsulated magnet 20 will stay in the correct position when the door is open. This is accomplished by the design of the tube end covers. The design of the tube covers include opposite angled attaching surfaces. When these tube covers are attached to the truck, this will create the required slant to the tube.

Both of the covers have the word "top" on them. This identifies the mounting orientation when attaching them to the truck body. This insures the angle mentioned above when the proper installation is completed.

Figure 3:
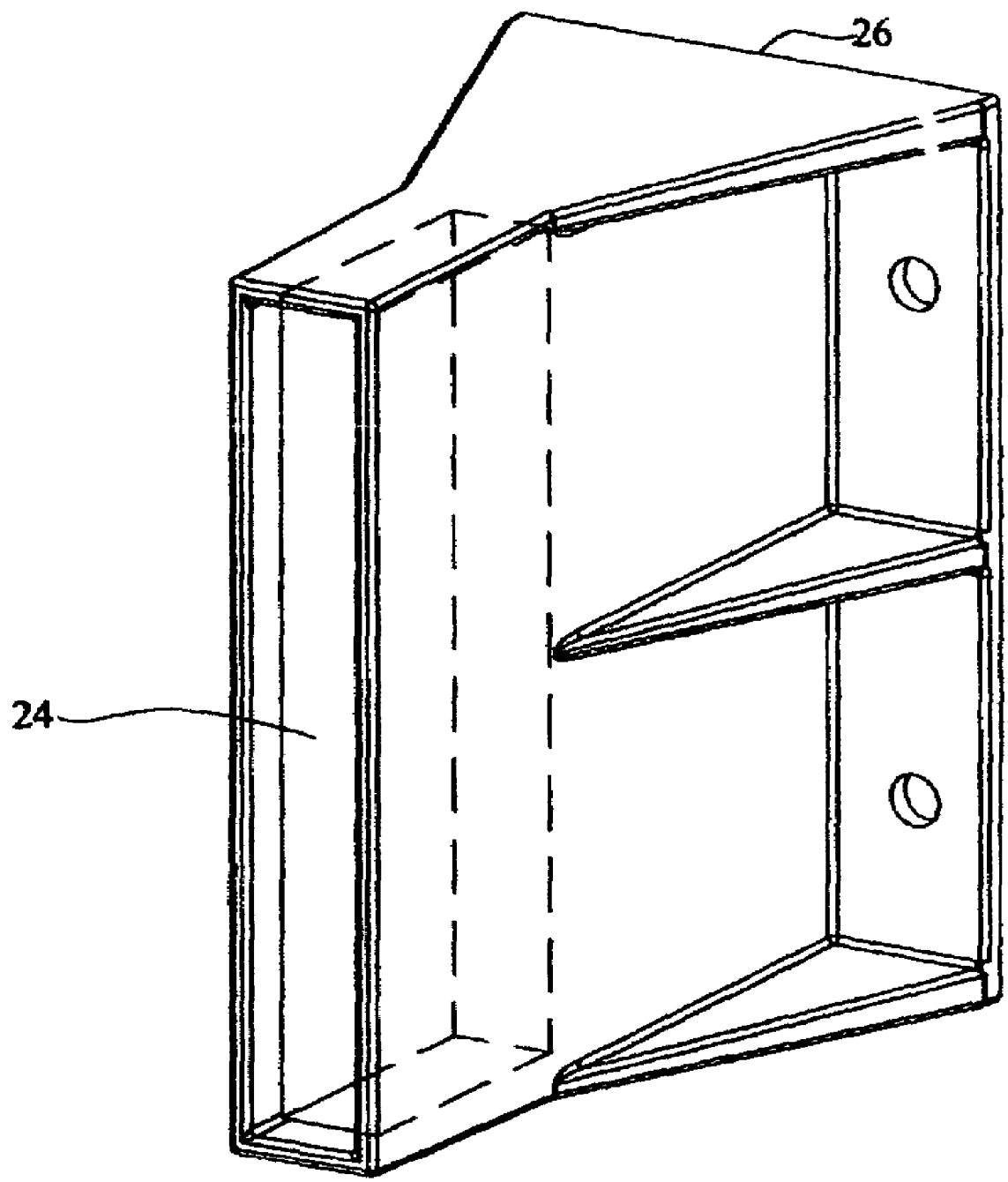
FIG. 3 is a perspective view of a door bracket showing the pocket to accommodate the bar magnet.
Figure 4:
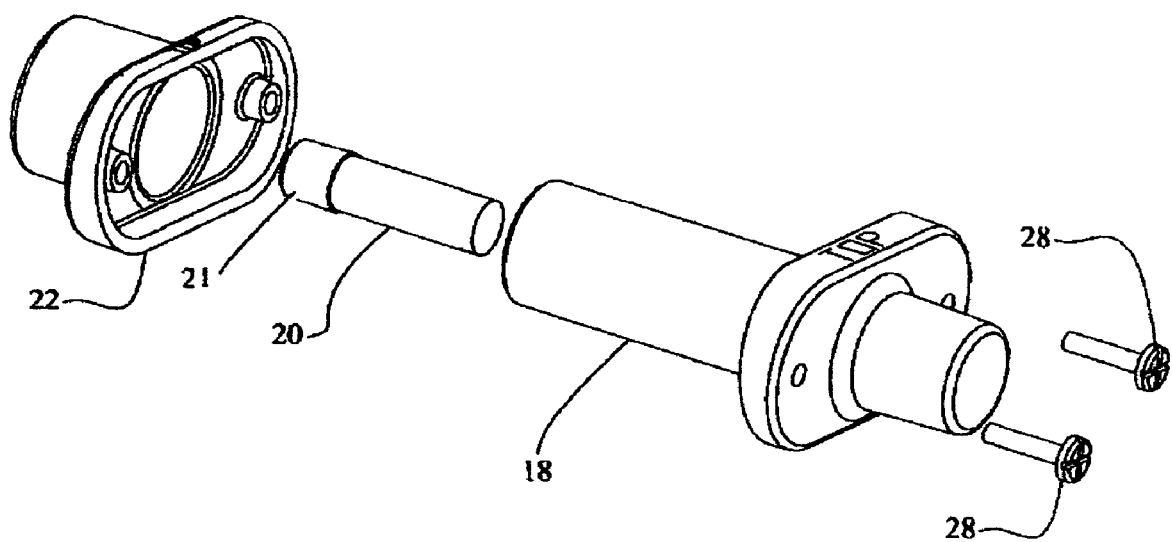
FIG. 4 is a perspective view of a tube and piston assembly showing the parts needed to be installed.

FIG. 3 shows the plastic door bracket with encapsulated bar magnet 26 molded with a pocket (cavity) to accept and hold an encapsulated bar magnet. The upper half of this encapsulated bar magnet will have the opposite polarity as the lower half of the encapsulated bar magnet has.

Both of these permanent magnets have two magnetic fields. Like magnetic fields repel and opposite magnetic fields attract. Therefore, by mounting the bracket and tube assemblies in the correct proximity to each other, the colorful indicator piston with encapsulated magnet 20 will move back and forth as needed. The door bracket with encapsulated bar magnet 26 is mounted close to the left hand inside door edge 11.

The two magnets in this invention are mounted so they will attract each other when the door is closed and repel each other as the door opens.

The lower half of the encapsulated bar magnet which is found in the door bracket with encapsulated bar magnet 26 has the opposite polarity as the top half of the encapsulated bar magnet.

The piston magnet 21 has the opposite polarity as the top half of the encapsulated bar magnet.

When the truck door is closed, the piston magnet 21 is attracted to the top half of the encapsulated bar magnet. These magnetic forces cause the colorful indicator piston with encapsulated Magnet 20 to move out of the driver's view.

When the truck door is raised to open, the lower half of the Door Bracket with Encapsulated Bar Magnet 26 passes near the piston magnet. This results in reversing the action from attracting to repelling each other. This causes the colorful Indicator Piston with Encapsulated Magnet 20 to be repelled and travel out to the Exterior Tube Cover. Thus, the colorful Indicator Piston with Encapsulated magnet 20 will stay visible to the driver until the door is closed and the Piston Magnet 21 will once more be attracted to the upper half of the door bracket with encapsulated bar magnet 26, which will draw the colorful indicator piston with encapsulated magnet 20 back up into the tube removing it from the driver's sight.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A magnetically operated door-open indicator comprising:
   means for providing the enclosure for the piston which has to move in and out; and providing a clear cover on the outside of the truck to enable the driver to see the current position of the piston when the indicator presents the open or closed reading; and providing a means of attaching this tube and cover to the truck box;
   means for providing an actual moveable indicator which reacts to the polarity positions of the bar magnet;
   means for sealing the end of the tube located on the interior of the truck box; and designed to insure the correct installation of the tube;
   means for transporting the bar magnet up and away from the tube assembly when the door is open; and
   transporting the bar magnet to the correct position when the door is closed to place the attracting magnetic field of the bar magnet near the piston's magnetic field; and conversely, when the door is opened the lower half of the bar magnet, which has reverse polarity, will repel the indicator piston;
   means for fastening the door bracket to the interior side of the truck door; and attaching the inside and outside tube covers to the truck box wall; and
   means for causing the colorful piston to move in and out when affected by reversing polarity of the bar magnet when the door is raised or lowered.

2. The magnetically operated door-open indicator in accordance with claim 1, wherein said means for providing the enclosure for the piston which has to move in and out; and providing a clear cover on the outside of the truck to enable the driver to see the current position of the piston when the indicator presents the open or closed reading; and providing a means of attaching this tube and cover to the truck box
   comprises a die-molded, transparent, weather resistant clear plastic tube with exterior cover.

3. The magnetically operated door-open indicator in accordance with claim 1, wherein said means for providing an actual moveable indicator which reacts to the polarity positions of the bar magnet
   comprises an encapsulated piston magnet, colored plastic, die-molded indicator piston with encapsulated magnet.

4. The magnetically operated door-open indicator in accordance with claim 1, wherein said means for sealing the end of the tube located on the interior of the truck box; and designed to insure the correct installation of the tube
   comprises a die-molded plastic interior tube cover.

5. The magnetically operated door-open indicator in accordance with claim 1, wherein said means for transporting the bar magnet up and away from the tube assembly when the door is open; and
   transporting the bar magnet to the correct position when the door is closed to place the attracting magnetic field of the bar magnet near the piston's magnetic field; and conversely, when the door is opened the lower half of the bar magnet, which has reverse polarity, will repel the indicator piston
   comprises a die-molded plastic, pre-drilled mounting holes door bracket with encapsulated bar magnet.

6. The magnetically operated door-open indicator in accordance with claim 1, wherein said means for fastening the door bracket to the interior side of the truck door; and attaching the inside and outside tube covers to the truck box wall
   comprises a non-corrosive material mounting screw.

7. The magnetically operated door-open indicator in accordance with claim 1, wherein said means for causing the colorful piston to move in and out when affected by reversing polarity of the bar magnet when the door is raised or lowered, comprises a permanent magnet piston magnet.

8. A magnetically operated door-open indicator comprising:
   a die-molded, transparent, weather resistant clear plastic tube with exterior cover, for providing the enclosure for the piston which has to move in and out; and providing a clear cover on the outside of the truck to enable the driver to see the current position of the piston when the indicator presents the open or closed reading; and providing a means of attaching this tube and cover to the truck box;
   an encapsulated piston magnet, colored plastic, die-molded indicator piston with encapsulated magnet, for providing an actual moveable indicator which reacts to the polarity positions of the bar magnet;
   a die-molded plastic interior tube cover, for sealing the end of the tube located on the interior of the truck box; and designed to insure the correct installation of the tube;
   a die-molded plastic, pre-drilled mounting holes door bracket with encapsulated bar magnet, for transporting the bar magnet up and away from the tube assembly when the door is open; and
   transporting the bar magnet to the correct position when the door is closed to place the attracting magnetic field of the bar magnet near the piston's magnetic field; and conversely, when the door is opened the lower half of the bar magnet, which has reverse polarity, will repel the indicator piston;
   a non-corrosive material mounting screw, for fastening the door bracket to the interior side of the truck door; and attaching the inside and outside tube covers to the truck box wall; and
   a permanent magnet piston magnet, for causing the colorful piston to move in and out when affected by reversing polarity of the bar magnet when the door is raised or lowered.

9. A magnetically operated door-open indicator comprising:
   a die-molded, transparent, weather resistant clear plastic tube with exterior cover, for providing the enclosure for the piston which has to move in and out; and providing a clear cover on the outside of the truck to enable the driver to see the current position of the piston when the indicator presents the open or closed reading; and providing a means of attaching this tube and cover to the truck box;
   an encapsulated piston magnet, colored plastic, die-molded indicator piston with encapsulated magnet, for providing an actual moveable indicator which reacts to the polarity positions of the bar magnet;
   a die-molded plastic interior tube cover, for sealing the end of the tube located on the interior of the truck box; and designed to insure the correct installation of the tube;
   a die-molded plastic, pre-drilled mounting holes door bracket with encapsulated bar magnet, for transporting the bar magnet up and away from the tube assembly when the door is open; and
   transporting the bar magnet to the correct position when the door is closed to place the attracting magnetic field of the bar magnet near the piston's magnetic field; and conversely, when the door is opened the lower half of the bar magnet, which has reverse polarity, will repel the indicator piston;
   a non-corrosive material mounting screw, for fastening the door bracket to the interior side of the truck door; and attaching the inside and outside tube covers to the truck box wall; and
   a permanent magnet piston magnet, for causing the colorful piston to move in and out when affected by reversing polarity of the bar magnet when the door is raised or lowered.

\* \* \* \* \*